US012588131B2

(12) United States Patent
Shin et al.

(10) Patent No.: US 12,588,131 B2
(45) Date of Patent: Mar. 24, 2026

(54) IRRADIATION APPARATUS AND IRRADIATION METHOD USING SAME

(71) Applicant: NATIONAL CANCER CENTER, Goyang-si (KR)

(72) Inventors: Dong Ho Shin, Suwon-si (KR); Tae Hyun Kim, Seoul (KR); Hak Soo Kim, Goyang-si (KR); Se Byeong Lee, Goyang-si (KR); Young Kyung Lim, Paju-si (KR); Jong Hwi Jeong, Seoul (KR)

(73) Assignee: NATIONAL CANCER CENTER, Goyang-si (KR)

( * ) Notice: Subject to any disclaimer, the term of this patent is extended or adjusted under 35 U.S.C. 154(b) by 186 days.

(21) Appl. No.: 18/695,583

(22) PCT Filed: Aug. 22, 2022

(86) PCT No.: PCT/KR2022/012514
§ 371 (c)(1),
(2) Date: Mar. 26, 2024

(87) PCT Pub. No.: WO2023/054899
PCT Pub. Date: Apr. 6, 2023

(65) Prior Publication Data

US 2024/0373538 A1 Nov. 7, 2024

(30) Foreign Application Priority Data

Sep. 29, 2021 (KR) ........................ 10-2021-0128910

(51) Int. Cl.
*H05G 1/02* (2006.01)
*H05G 1/38* (2006.01)
*H05G 1/46* (2006.01)

(52) U.S. Cl.
CPC ................. *H05G 1/02* (2013.01); *H05G 1/38* (2013.01); *H05G 1/46* (2013.01)

(58) Field of Classification Search
CPC ............... H05G 1/02; H05G 1/38; H05G 1/46
See application file for complete search history.

(56) References Cited

U.S. PATENT DOCUMENTS 8,989,352 B2 3/2015 Laws et al.
2012/0219107 A1* 8/2012 Kurochi ............... A61B 6/4291 378/19
2018/0184993 A1* 7/2018 Kwon .................. A61B 5/4312

FOREIGN PATENT DOCUMENTS

KR 10-2008-0021579 A 3/2008
KR 10-2009-0093654 A 9/2009
(Continued)

OTHER PUBLICATIONS

International Search Report mailed on Dec. 30, 2022 in PCT/KR2022/012514 filed on Aug. 22, 2022 (2 pages).

*Primary Examiner* — Hugh Maupin
(74) *Attorney, Agent, or Firm* — Oblon, McClelland, Maier & Neustadt, L.L.P.

(57) ABSTRACT

Provided is a radiation irradiation device and method in which radiation intensity can be adjusted depending on an irradiation position. The device includes a radiation source, a target plate having an irradiation hole through which radiation emitted from the radiation source passes and having a first target stopper and a second target stopper formed to protrude on both surfaces, respectively, X-axis shield plates and Y-axis shield plates coupled to both sides of one surface of the target plate and including shield stoppers formed on a contact surface with the target plate and capable of being moved with respect to the target plate. The X-axis shield plate are coupled laterally with shield stoppers capable of moving laterally and the Y-axis plate are
(Continued)

coupled longitudinally with shield stoppers capable of moving longitudinally. The shield stoppers can be moved between two first target stoppers or two second target stoppers adjacent to each other.

20 Claims, 14 Drawing Sheets

(56) References Cited

FOREIGN PATENT DOCUMENTS

| | | | |
|---|---|---|---|
| KR | 10-2009-0058145 | B1 | 1/2010 |
| KR | 10-2014-0116738 | A | 10/2014 |
| KR | 10-2015-0100824 | A | 9/2015 |
| KR | 10-2015-0126593 | A | 9/2015 |
| KR | 10-2016-0059534 | A | 5/2016 |
| KR | 10-2017-0093500 | A | 8/2017 |

* cited by examiner

IRRADIATION APPARATUS AND IRRADIATION METHOD USING SAME

CROSS-REFERENCE TO RELATED APPLICATION

This application is a National Phase entry of Korean PCT Application PCT/KR2022/012514, filed on Aug. 22, 2022, which claims priority to and the benefit of Korean Patent Application No. 10-2021-0128910, filed on Sep. 29, 2021, the entire disclosures of which are incorporated herein by reference.

FIELD

The present invention relates to a radiation irradiation device and a radiation irradiation method using the same, and more particularly, to a radiation irradiation device and a radiation irradiation method using the same, in which radiation intensity may be adjusted depending on an irradiation position.

BACKGROUND

The radiation irradiation device refers to a device that is driven to seal a radioactive generating device or a radiation source and to irradiate a predetermined radiation dose to a sample as necessary.

The radiation irradiation device may be used in various fields such as radiation chemistry, food disinfection, non-destructive testing, and radiation therapy. In particular, radiation therapy is one of the three major cancer treatment methods, along with surgery and chemotherapy.

Tumors subject to radiation treatment have irregular sizes and distributions, so the required radiation dose distribution may vary depending on the position. Accordingly, intensity modulated radiation therapy (IMRT) may be considered.

The IMRT is a term that refers to a treatment therapy that minimizes side effects caused by radiation on normal organs around the irradiation area and enables intensive treatment of specific irradiation areas by adjusting the intensity of the radiation emitted depending on the irradiation position.

In the conventional IMRT, Multi-leaf Collimator (MLC) or a scanning-type radiation therapy device is commonly used. Among them, the MLC is formed as a complex structure in which 80 to 120 multi-leaf are combined, and individual motors are needed for each lobe. In addition, in the case of the scanning-type radiation therapy device, it is difficult to apply the scanning method to the radiation due to the weak electrical properties of the X-ray itself, and therefore, some of the scanning methods are applied only to positively charged proton beams or heavy ion particle beams, but the structure of the system is complicated and the required scale is also large.

Therefore, the development of a radiation irradiation device that can adjust the intensity of the radiation with a more simplified structure may be considered.

Korean Patent Application Publication No 10-2016-0059534 discloses a multi-split multi-leaf collimator of a radiation therapy device. Specifically, the multi-split multi-leaf collimator is disclosed in which multi-leaf are driven by being split into main leaf and subordinate leaf.

However, in the multi-leaf collimator of this type, the driver must be separately provided for each leaf, and the entire device is likely to malfunction even when one leaf or one driver is damaged.

Korean Patent Registration No. 10-0936075 discloses a device for adjusting an X-ray irradiation range. Specifically, disclosed is the device for adjusting an X-ray irradiation range in which an opening through which an X-ray wave is incident can be moved by a plurality of shutter panels.

However, this type of X-ray irradiation range adjusting device requires at least four shutter panels to change the position of the opening. Accordingly, the structure of the X-ray irradiation range adjusting device may be complicated, and its volume may be increased.

(Patent Document 1) Korean Patent Publication No. 10-2016-0059534 (2016.05.27.)

(Patent Document 2) Korean Patent Registration No. 10-0936075 (2010.01.12.)

SUMMARY

Technical Problem

It is an object of the present invention to provide a radiation irradiation device and a radiation irradiation method using the same, in which the radiation intensity can be adjusted according to the irradiation position.

Another object of the present invention is to provide a radiation irradiation device and a radiation irradiation method using the same, in which a radiation shielding member around a radiation irradiation area can be miniaturized.

Still another object of the present invention is to provide a radiation irradiation device and a radiation irradiation method using the same, in which the structure can be further simplified.

Still another object of the present invention is to provide a radiation irradiation device and a radiation irradiation method using the same, in which a radiation dose that is lost without reaching an irradiation area can be further reduced.

Still another object of the present invention is to provide a radiation irradiation device and a radiation irradiation method, in which distribution of the radiation dose can be more precisely adjusted.

Technical Solution

In order to achieve the above object, according to an embodiment of the present invention, there is provided a radiation irradiation device including: a radiation source; a target plate having an irradiation hole through which radiation emitted from the radiation source passes, and having a first target stopper and a second target stopper formed to protrude on both surfaces, respectively; X-axis shield plates coupled to both sides in a lateral direction of one surface of the target plate, having an X-axis shield stopper formed on a contact surface with the target plate, and capable of being laterally moved with respect to the target plate; and Y-axis shield plates coupled to both sides in a longitudinal direction of the other surface of the target plate, having a Y-axis shield stopper formed on a contact surface with the target plate, and capable of being longitudinally moved with respect to the target plate, wherein the X-axis shield stopper may be moved between two first target stoppers adjacent to each other, and wherein the Y-axis shield stopper may be moved between two second target stoppers adjacent to each other.

In addition, the radiation irradiation device may include a frame coupled to the target plate, the X-axis shield plates, and the Y-axis shield plates to be relatively moved with respect to each other, and having a through-hole overlapping the irradiation hole in an irradiation direction of the radiation, wherein the through-hole may have a cross-sectional area that is larger than the cross-sectional area of the irradiation hole and is smaller than that of the target plate.

In addition, a lateral width of the through-hole may be formed to be smaller than the sum of a lateral width of the target plate divided in half and a lateral width of the X-axis shield plates, and a longitudinal width of the through-hole may be formed to be smaller than the sum of a longitudinal width of the target plate divided in half and a longitudinal width of the Y-axis shield plates.

In addition, the X-axis shield plates may have X-axis shield coupling protrusions formed to protrude from both ends in the longitudinal direction, the Y-axis shield plates may have Y-axis shield coupling protrusions formed to protrude from both ends in the lateral direction, respectively, and the frame may have a guide groove formed to be recessed, and while the X-axis shield coupling protrusions or the Y-axis shield coupling protrusion are inserted into the guide groove, the guide groove guides a movement path of the X-axis shield plates or the Y-axis shield plates.

In addition, the radiation irradiation device may include a controller configured to adjust an intensity of the radiation irradiated to a specific point.

In addition, the controller may include a scan rate controller configured to adjust a scan rate of the radiation source, a continuation time controller configured to adjust a radiation irradiation time for the specific point, and a radiation dose distribution corrector configured to calculate a radiation dose distribution correction coefficient for each point in an irradiation area, and apply the calculation result to the radiation source.

In addition, the radiation source may emit the radiation repeatedly multiple times with respect to a specific point.

In addition, the radiation emitted from the radiation source may be an X-ray.

In addition, according to another embodiment of the present invention, a radiation irradiation device may include: a radiation source; a frame having a through-hole through which radiation emitted from the radiation source passes, and having frame rails extended in a longitudinal direction on both sides of a lateral direction of one surface; a target plate including at least one pair of leaves and a leaf guider disposed on both sides of the at least one pair of leaves in the longitudinal direction, respectively, and having a target stopper formed on both sides of the longitudinal direction; and a shield plate coupled to both sides of the longitudinal direction of the target plate, formed with a shield stopper on a contact surface with the target plate, and movable in the longitudinal direction with respect to the target plate, wherein the at least one pair of leaves may be moved laterally between the two leaf guiders and moved longitudinally along the frame rail, and wherein the shield stopper may be moved between the target stopper and the leaf guider.

In addition, a longitudinal width of the through-hole may be formed to be smaller than the sum of a longitudinal width of the target plate divided in half and a longitudinal width of the shield plate.

In addition, the target plate may include a wing extended from one side of the longitudinal direction of the leaf guider in a direction away from the leaves, and having a target stopper formed on one end thereof.

In addition, the leaves may have a leaf rail extended in the lateral direction on both surfaces of the longitudinal direction, and may be moved in the lateral direction by an X-axis position variable unit rotated along the leaf rail.

In addition, the frame may have a guider formed to be recessed, and the guider may guide a longitudinal movement path of the shield plate, and the shield plate may have shield coupling protrusions formed to protrude from both ends in the lateral direction, and the shield coupling protrusions may be inserted into the guider and are movable along the guider.

In addition, the radiation irradiation device may include a controller configured to adjust an intensity of the radiation irradiated to a specific point.

In addition, the controller may include a scan rate controller configured to adjust a scan rate of the radiation source; a continuation time controller configured to adjust a radiation irradiation time for the specific point; and a radiation dose distribution corrector configured to calculate a radiation dose distribution correction coefficient for each point in an irradiation area, and apply the calculation result to the radiation source.

In addition, the present invention may provide a radiation irradiation method, including (a) adjusting a position of the target plate; (b) emitting the radiation from the radiation source toward the target plate; and (c) controlling a radiation dose emitted from the radiation source.

In addition, the step (a) may include (a1) adjusting a lateral position of the target plate; and (a2) adjusting a longitudinal position of the target plate.

In addition, (b0) correcting distribution of the radiation dose emitted from the radiation source may precede the step (b).

In addition, the step (c) may include (c1) controlling a scan rate of the radiation source.

In addition, the step (c) may include (c2) controlling a continuation time of the radiation with respect to a specific position.

Advantageous Effects

Among the various effects of the present invention, the effects that can be obtained through the above-described solutions are as follows.

First, the radiation emitted from the radiation source passes through the irradiation hole of the target plate and then reaches a specific point. At this time, the irradiation position of the target plate may be varied in the lateral or longitudinal direction.

The radiation intensity for the specific point can be adjusted by the scan rate of the radiation source and the continuation time of the target plate at the predetermined position. As the scan rate decreases or the continuation time increases, the radiation intensity can increase.

Therefore, the radiation intensity can be adjusted according to the irradiation position and can be used for various object to be irradiated. For example, when the size and distribution are irradiated to irregular tumors, the radiation may be irradiated with the intensity corresponding to the size and distribution of the tumor.

In addition, the target plate may be moved in the lateral direction and the longitudinal direction with respect to the through-hole of the frame. In this case, a shield plate is provided to shield the radiation irradiation to a portion where the through-hole and the target plate do not overlap.

The shield plate includes an X-axis shield plate moved along the lateral direction of the target plate and a Y-axis shield plate moved along the longitudinal direction of the target plate. In this case, the X-axis shield plate and the Y-axis shield plate may slide in the lateral direction and the longitudinal direction with respect to the target plate, respectively.

Therefore, the cross-sectional area of the target plate and the shield plate required for unnecessary shielding of the radiation can be reduced. Furthermore, the volume of the gantry head and the jig for supporting the same can be reduced.

In addition, when the position of the target plate is varied, only two motors are required, such as the X-axis position variable unit and the Y-axis position variable unit. In addition, the dose flattening filter for correcting the radiation dose distribution is not required. In addition, since a repainting method is used in which a specific treatment surface is re-irradiated multiple times with a small dose, a gating process according to respiration is not required, and gating equipment can also be omitted.

In consideration of this point, the structure of the radiation irradiation device may be simplified. Therefore, the manufacturing cost and the manufacturing process of the radiation irradiation device can be reduced, and the convenience of maintenance and repair can be further improved.

In addition, as described above, as the dose flattening filter is not used when the radiation is emitted, the radiation dose emitted from the radiation source is not filtered by the dose flattening filter.

Therefore, the loss of the radiation dose by the dose flattening filter can be prevented. Furthermore, the reduction of the radiation energy and the dose rate emitted from the radiation source can be prevented.

In addition, the aperture through which the size of the transmission hole is adjustable is coupled to the irradiation hole of the target plate.

Therefore, the radiation dose distribution can be more precisely adjustable. Therefore, the radiation irradiation device and the radiation irradiation method using the same can be used for various types of the objects to be irradiated.

DETAILED DESCRIPTION

Hereinafter, the radiation irradiation device 1 and the radiation irradiation method using the same according to an embodiment of the present invention will be described in more detail with reference to the drawings.

In the following description, in order to clarify the features of the present invention, descriptions of some components may be omitted.

In this specification, the same reference numbers are assigned to the same components even in different embodiments, and duplicate descriptions thereof will be omitted.

The accompanying drawings are merely provided to allow easy understanding of the embodiments disclosed in the specification, and the technical idea disclosed in the specification is not limited by the accompanying drawings.

The singular forms include plural forms unless the context clearly dictates otherwise.

The terms "upper", "lower", "left", "right", "front side" and "rear side" used in the following description will be understood with reference to the coordinate system shown in FIGS. 2 to 4 and 10.

Figure 1:
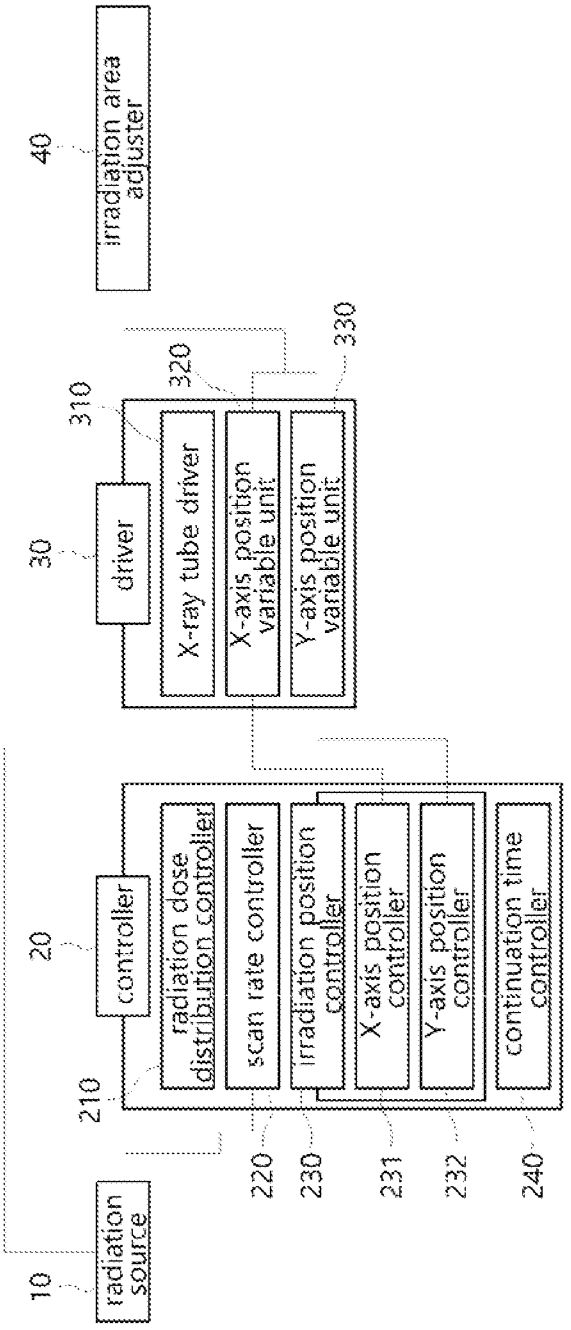
FIG. 1 is a schematic view illustrating a radiation irradiation device according to an embodiment of the present invention.

Hereinafter, a radiation irradiation device 1 according to an embodiment of the present invention will be described with reference to FIG. 1.

The radiation device 1 emits radiation to a specific target. At this time, an irradiation position and an intensity of the emitted radiation may be adjusted as needed. This is to respond to various types of radiation irradiation, as it is common for the required radiation dose distribution to be irregularly formed depending on the position.

In the illustrated embodiment, the radiation irradiation device 1 includes a radiation source 10, a controller 20, a driver 30, and an irradiation area adjuster 40.

The radiation source 10 emits radiation toward the object to be irradiated. In one embodiment, the radiation source 10 emits radiation with a radiation dose distribution correction coefficient applied to each point in the radiation area.

The radiation source 10 according to an embodiment of the present invention does not require a dose flattening filter for correcting the radiation dose distribution. Accordingly, the radiation dose emitted from the radiation source 10 is not filtered by the dose flattening filter. Therefore, the loss of the radiation dose due to the dose flattening filter can be prevented. Furthermore, a decrease in the radiation energy and dose rate emitted from the radiation source 10 may be prevented.

In an embodiment, the radiation source 10 may emit radiation repeatedly multiple times with respect to a specific point. Accordingly, a repainting method in which radiation is re-irradiated multiple times with a small dose on a specific treatment surface may be implemented. Accordingly, a gating process according to respiration is not required, and gating equipment may also be omitted.

As a result, the structure of the radiation irradiation device 1 may be simplified, and the manufacturing cost and the manufacturing process of the radiation irradiation device 1 may be reduced. In addition, the convenience of maintenance and repair may also be improved.

In an embodiment, the radiation source 10 may be an X-ray tube that emits X-rays. In the above example, the radiation source 10 includes a cathode that emits an electron beam and an anode that emits an X-ray beam at a different angle from the electron beam when the electron beam emitted from the cathode collides with it.

The intensity of the radiation emitted from the radiation source 10 may be adjusted by the controller 20.

The controller 20 adjusts the intensity of radiation irradiated to the specific point.

The controller 20 is electrically connected to the radiation source 10 and the driver 30, respectively, to control the radiation source 10 and the driver 30.

In the illustrated embodiment, the controller 20 includes a radiation dose distribution corrector 210, a scan rate controller 220, an irradiation position controller 230, and a continuation time controller 240.

The radiation dose distribution corrector 210 and the scan rate controller 220 are electrically connected to the radiation source 10, respectively, and transmit a control signal to the radiation source 10.

The radiation dose distribution corrector 210 calculates the radiation dose distribution correction coefficient for each point in the irradiation area. The calculation result is transmitted to the radiation source 10, and the radiation source 10 emits radiation based on it. In addition, the scan rate controller 220 adjusts the scan rate of the radiation source 10. The scan rate controller 220 may increase or decrease the intensity of radiation emission by decreasing or increasing the scan rate of the radiation source 10.

The irradiation position controller 230 determines the irradiation position emitted from the radiation source 10. The irradiation position controller 230 may determine the irradiation position by adjusting the position of a target plate 440 to be described later. In an embodiment, the irradiation position controller 230 includes an X-axis position controller 231 that adjusts a lateral position of the target plate 440 and a Y-axis position controller 232 that adjusts a longitudinal position of the target plate 440. This will be described later in detail.

The continuation time controller 240 adjusts the radiation irradiation time for a specific point. In one embodiment, the holding time controller 240 adjusts the radiation irradiation time for the specific point by adjusting the time for which the irradiation area remains fixed at the specific point. The continuation time controller 240 may increase or decrease the radiation emission intensity by increasing or decreasing the radiation irradiation time for the specific point.

The controller 20 transmits the driving signal to the radiation source 10 and the driver 30.

The driver 30 transfers power for each component of the radiation irradiation device 1 to operate.

In the illustrated embodiment, the driver 30 is electrically connected to the radiation source 10, the controller 20, and the irradiation area adjuster 40, which will be described later, and includes the X-ray tube driver 310, the X-axis position variable unit 320, and the Y-axis position variable unit 330.

The X-ray tube driver 310 operates the start and stop of the radiation source 10 composed of the X-ray tube. To this end, the X-ray tube driver 310 is electrically connected to the radiation source 10.

The X-axis position variable unit 320 and the Y-axis position variable unit 330 may be electrically connected to the irradiation area adjuster 40, which will be described later, to vary the irradiation position.

Figure 2:
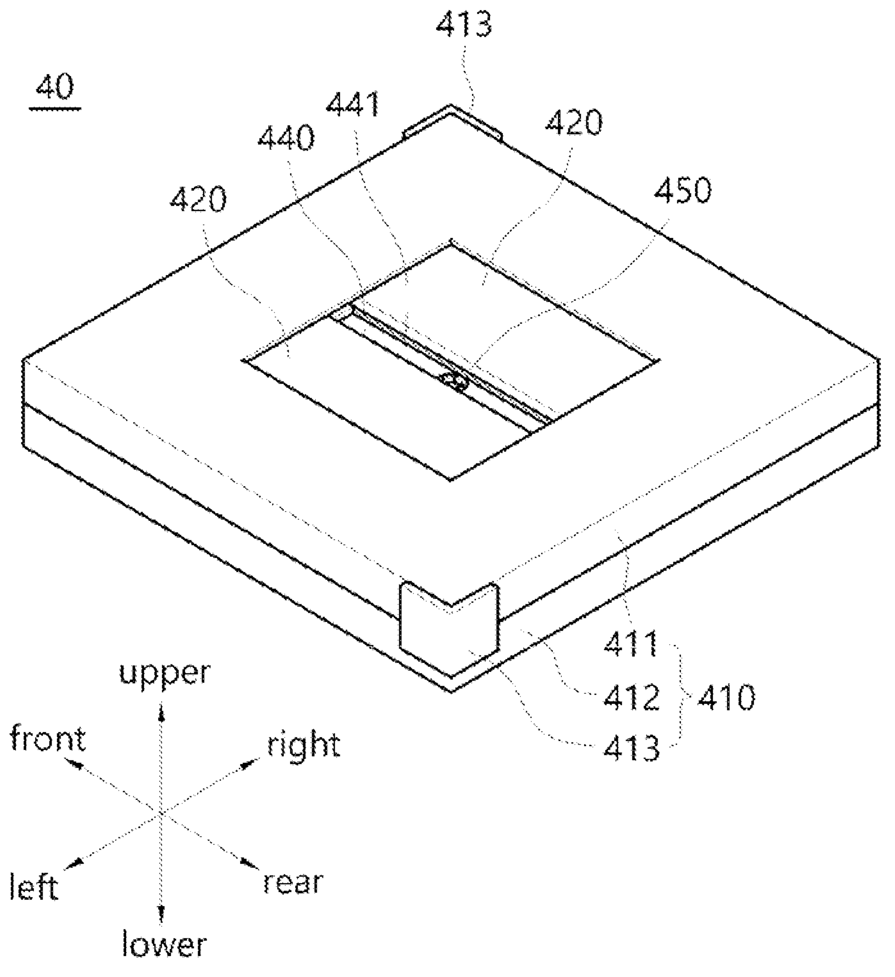
FIG. 2 is a perspective view illustrating an irradiation area adjuster provided in the radiation irradiation device of FIG. 1.
Figure 3:
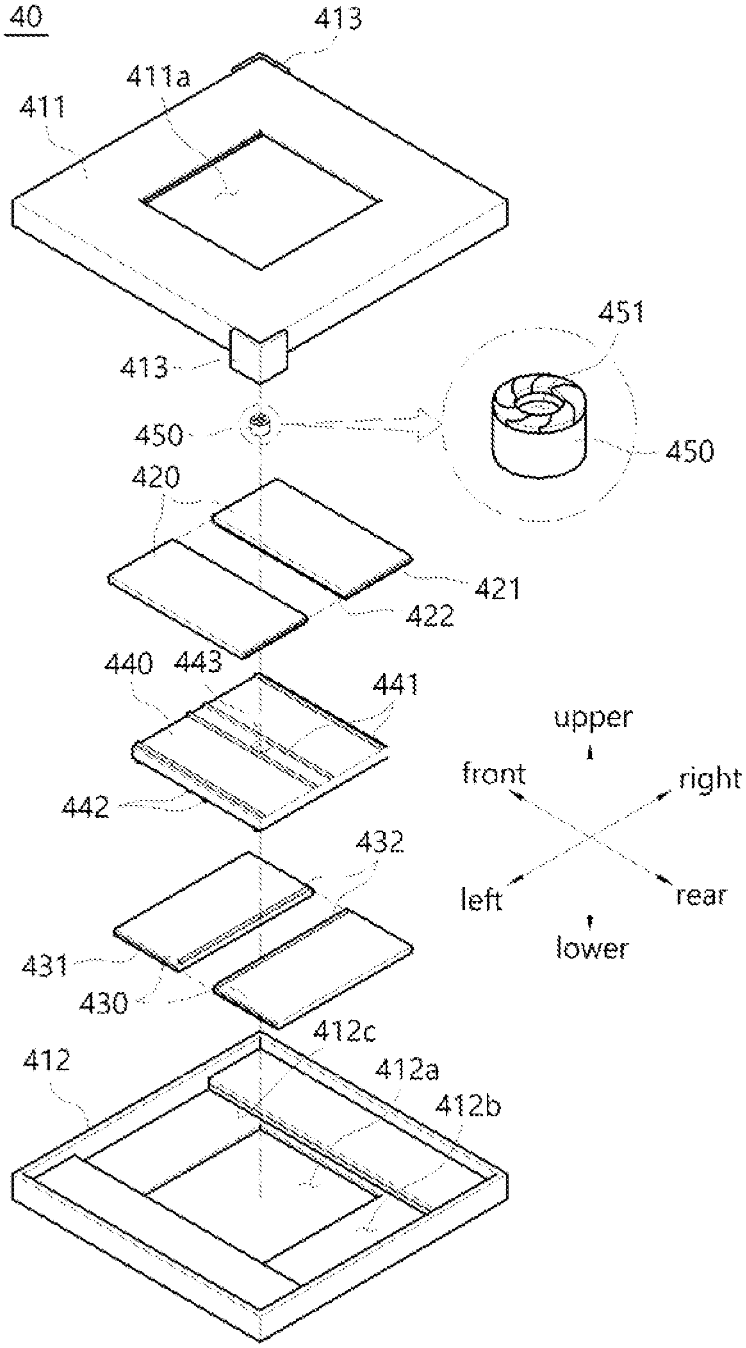
FIG. 3 is an exploded perspective view illustrating components of the irradiation area adjuster of FIG. 2.
Figure 4:
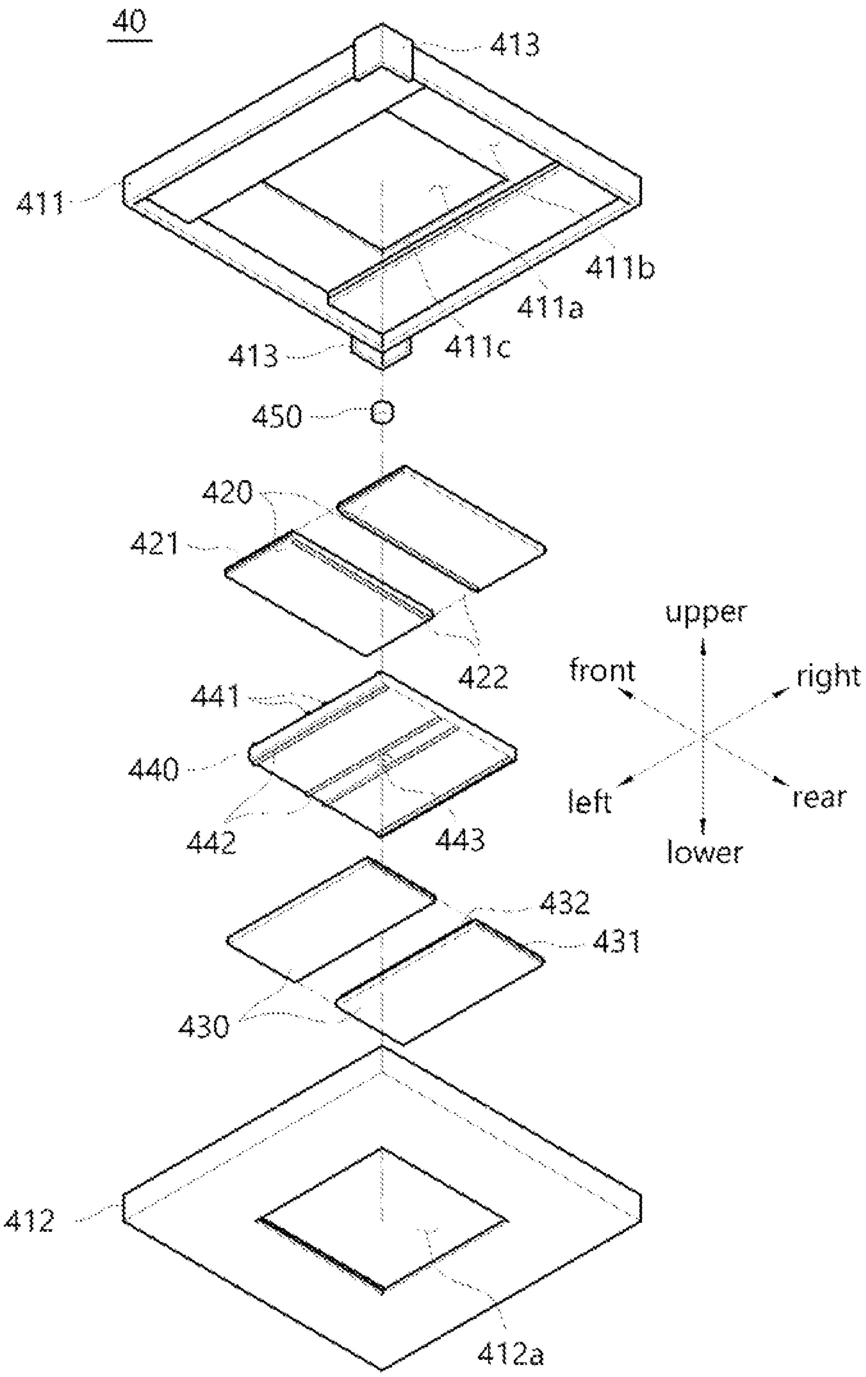
FIG. 4 is an exploded perspective view illustrating components of the irradiation area adjuster of FIG. 2 in a direction different from FIG. 3.

Hereinafter, the irradiation area adjuster 40 will be described with reference to FIGS. 2 to 4.

The irradiation area adjuster 40 is operated by the driver 30 to manipulate the irradiation position.

In the illustrated embodiment, the irradiation area adjuster 40 includes a frame 410, an X-axis shield plate 420, a Y-axis shield plate 430, a target plate 440, and an aperture 450.

The frame 410 forms the exterior of the irradiation area adjuster 40. In addition, the frame 410 provides a space in which various components of the irradiation area adjuster 40 may be mounted.

In the illustrated embodiment, a space in which various components may be accommodated is formed in the frame 410. In an embodiment not shown, various components may be disposed on one surface of the frame 410. However, the frame 410 is not limited to the above embodiment, and may be formed in various structures that provide variable paths of other components.

In the illustrated embodiment, the frame 410 is formed in a rectangular parallelepiped shape. In addition, in the above embodiment, the frame 410 includes an upper frame 411, a lower frame 412, and a fixing member 413.

The upper frame 411 forms the upper exterior of the frame 410.

An upper through-hole 411*a* is formed in a portion of the upper frame 411.

In the illustrated embodiment, the upper through-hole 411*a* is located at a central portion of the upper frame 411.

The upper through-hole 411*a* functions as a passage of radiation emitted from the radiation source 10. In addition, the upper through-hole 411*a* is disposed adjacent to the object to be irradiated.

In the illustrated embodiment, the upper through-hole 411*a* is formed with a square cross-section extending in the vertical direction. However, the upper through-hole 411*a* is not limited to the shape shown and may be formed in various shapes corresponding to the irradiation area. For example, the upper through-hole 411*a* may have a circular cross-section extending in the vertical direction.

An upper concave 411*b* is recessed on one side of the upper frame 411. The upper concave 411*b* extends in the lateral direction, that is, in the illustrated embodiment, in the front-rear direction. In addition, the upper concave 411*b* extends through the upper through-hole 411*a*. That is, the upper through-hole 411*a* is formed on the upper concave 411*b*.

An upper guide groove 411*c* is recessed on one side of the upper through-hole 411*a*. The upper guide groove 411*c* guides the movement path of an X-axis shield plate 420 to be described later. This will be described later in detail.

The lower frame 412 forms the lower exterior of the frame 410. The lower frame 412 is coupled to the lower side of the upper frame 411. Additionally, the lower frame 412 is formed to correspond in size and shape to the upper frame 411.

A lower through-hole 412*a*, a lower concave 412*b*, and a lower guide groove 412*c* are formed in a portion of the lower frame 412. The lower through-hole 412*a*, the lower concave 412*b*, and the lower guide groove 412*c* correspond in functions and structures to the upper through-hole 411*a*, the upper concave 411*b*, and the upper guide groove 411*c* of the upper frame 411, respectively.

However, the lower concave 412*b* and the lower guide groove 412*c* is different from the upper concave 411*b* and the upper guide groove 411*c* in that the lower concave 412*b* extends in the longitudinal direction, that is, in the left-right direction in the illustrated embodiment, and the lower guide groove 412*c* guides a movement path of the Y-axis shield plate 430 to be described later.

The coupled state of the upper frame 411 and the lower frame 412 may be maintained by the fixing member 413.

The fixing member 413 is coupled to the upper frame 411 and the lower frame 412, respectively, to prevent the upper frame 411 and the lower frame 412 from being randomly separated from each other.

The fixing member 413 is formed in a shape corresponding to the contact surface of the upper frame 411 and the lower frame 412. In the illustrated embodiment, the fixing member 413 is formed in the shape of a plate bent at a predetermined angle.

In an embodiment, the fixing member 413 may be attached to any one of the upper frame 411 and the lower frame 412 and may be detachably coupled to the other of the upper frame 411 and the lower frame 412.

Inside the frame 410, an X-axis shield plate 420, a Y-axis shield plate 430, and a target plate 440 are embedded.

The X-axis shield plate 420 and the Y-axis shield plate 430 each shield the periphery of the target plate 440 so that the radiation is not irradiated to the lateral and longitudinal peripheries of the target plate 440.

The X-axis shield plate 420 is coupled to the frame 410. In the embodiment shown, the X-axis shield plate 420 is coupled to the upper frame 411. Specifically, the X-axis shield plate 420 is inserted into and coupled to the upper concave 411*b*.

The X-axis shield plate 420 may be moved relative to the frame 410. In the illustrated embodiment, the movement of the X-axis shield plate 420 may be guided by the upper guide groove 411*c* of the frame 410.

The X-axis shield plate 420 is formed in a plate shape that may be slid with respect to the frame 410. In the illustrated embodiment, the X-axis shield plate 420 is formed in a rectangular plate shape.

When the X-axis shield plate 420 is inserted into the upper concave 411*b* of the upper frame 411, the X-axis shield plate 420 is formed in a shape corresponding to the upper concave 411*b*, and its longitudinal width is formed to be smaller than the longitudinal width of the upper concave 411*b*.

In the illustrated embodiment, the X-axis shield coupling protrusions 421 are formed to protrude from both ends of the X-axis shield plate 420 in the longitudinal direction. In the above embodiment, the X-axis shield coupling protrusions 421 may be inserted into and coupled to the upper guide groove 411*c* of the upper frame 411 and reciprocally move in the lateral direction along the upper guide groove 411*c*.

In addition, the X-axis shield stopper 422 is formed to protrude on one surface of the X-axis shield plate 420.

The Y-axis shield plate 430 is coupled to the frame 410 in a state of being spaced apart from the X-axis shield plate 420. In the embodiment shown, the Y-axis shield plate 430 is coupled to the lower frame 412. Specifically, the Y-axis shield plate 430 is inserted into and coupled to the lower concave 412*b*.

The Y-axis shield plate 430 may be moved relative to the frame 410. At this time, the direction of movement of the Y-axis shield plate 430 intersects the direction of movement of the X-axis shield plate 420. In the illustrated embodiment, the movement of the Y-axis shield plate 430 may be guided by the lower guide groove 412*c* of the frame 410.

The Y-axis shield plate 430 is formed in a plate shape that can be slid with respect to the frame 410. In the illustrated embodiment, the Y-axis shield plate 430 is formed in a rectangular plate shape.

When the Y-axis shield plate 430 is inserted into the lower concave 412*b* of the lower frame 412, the Y-axis shield plate 430 is formed in a shape corresponding to the lower concave 412*b*, and its lateral width is smaller than the lateral width of the lower concave 412*b*.

In the illustrated embodiment, Y-axis shield coupling protrusions 431 are formed to protrude from both lateral ends of the Y-axis shield plate 430, respectively. In the above embodiment, the Y-axis shield coupling protrusions 431 may be inserted into and coupled to the lower guide groove 412*c* of the lower frame 412, and may be reciprocally moved in the longitudinal direction along the lower guide groove 412*c*.

In addition, the Y-axis shield stopper 432 is formed to protrude on one surface of the Y-axis shield plate 430.

A target plate 440 is disposed between the X-axis shield plate 420 and the Y-axis shield plate 430.

The target plate 440 determines the irradiation area and shielding area of the radiation by varying its position.

The target plate 440 is coupled to the frame 410. At this time, the target plate 440 may be moved relative to the frame 410. In the illustrated embodiment, the target plate 440 is accommodated in the inner space of the frame 410.

In addition, the target plate 440 is disposed to overlap the through-holes 411*a* and 412*a* of the frame 410 in the radiation irradiating direction. In the illustrated embodiment, the target plate 440 overlaps with the upper through-hole 411*a* and the lower through-hole 412*a* in the vertical direction, which is the radiation irradiation direction.

The X-axis shield plates 420 are coupled to both sides in the lateral direction of one surface of the target plate 440, and the Y-axis shield plates 430 are coupled to both sides in the longitudinal direction of the other surface. In the illustrated embodiment, the X-axis shield plates 420 are coupled to the front and the rear sides of the upper surface of the target plate 440, and the Y-axis shield plates 430 are coupled to the left and right sides of the lower surface thereof.

The target plate 440 may slide relative to the X-axis shield plate 420 and the Y-axis shield plate 430 in the lateral and longitudinal directions, respectively. To this end, the target plate 440 is formed in a plate shape capable of sliding with respect to the X-axis shield plate 420 and the Y-axis shield plate 430. In the illustrated embodiment, the target plate 440 is formed in a rectangular plate shape.

The cross-sectional area of the target plate 440 is formed to be larger than the cross-sectional area of the through-hole of the frame 410. This is to prevent leakage of radiation that is not shielded by the target plate 440.

A first target stopper 441 and a second target stopper 442 are formed to protrude on both sides of the target plate 440, respectively. In the illustrated embodiment, the first target stopper 441 is formed on the upper surface of the target plate 440, and the second target stopper 442 is formed on the lower surface of the target plate 440.

The first target stopper 441 may slide while in contact with any one of the X-axis shield plate 420 and the Y-axis shield plate 430. Conversely, the second target stopper 442 may slide while in contact with the other one of the X-axis shield plate 420 and the Y-axis shield plate 430.

A plurality of first target stoppers 441 and second target stoppers 442 may be provided. In the illustrated embodiment, four first target stoppers 441 and second target stoppers 442 are provided. In the above embodiment, the plurality of first target stoppers 441 are arranged along the lateral direction, and the plurality of second target stoppers 442 are arranged along the longitudinal direction.

An irradiation hole 443 is formed through a portion of the target plate 440. In the illustrated embodiment, the irradiation hole 443 is located at the central portion of the target plate 440.

The irradiation hole 443 provides a passage for movement of radiation emitted from the radiation source 10 and directed to the object to be irradiated.

The irradiation hole 443 overlaps the through-hole of the frame 410 in the direction of radiation irradiation. In the illustrated embodiment, the irradiation hole 443 overlaps the through-hole in the vertical direction.

In the illustrated embodiment, the irradiation hole 443 is formed with a circular cross-section extending in the vertical direction. However, the irradiation hole 443 is not limited to the shape shown and may be formed in various shapes through which radiation may pass. For example, the irradiation hole 443 may be formed with a rectangular cross-section extending in the vertical direction.

The cross-sectional area of the irradiation hole 443 is preferably smaller than the cross-sectional area of the through-hole. This is to reduce the irradiation cross-sectional area of the radiation emitted by the through-hole to finely adjust the irradiation position.

An aperture 450 may be coupled through the irradiation hole 443.

The aperture 450 adjusts the amount of radiation passed through the irradiation hole 443.

The aperture 450 is coupled to the inner circumferential surface of the irradiation hole 443. For this purpose, the outer circumference of the aperture 450 is preferably formed in a shape corresponding to the inner circumference of the irradiation hole 443.

A transmission hole 451 is formed through the inside of the aperture 450. In an embodiment, the aperture 450 may adjust the amount of radiation passing through by adjusting the degree of opening and closing of the transmission hole 451.

Through this, the dose distribution of radiation may be more finely adjusted. Furthermore, the radiation irradiation device 1 and the radiation irradiation method using the same may be used for more diverse types of irradiation object.

Figure 5:
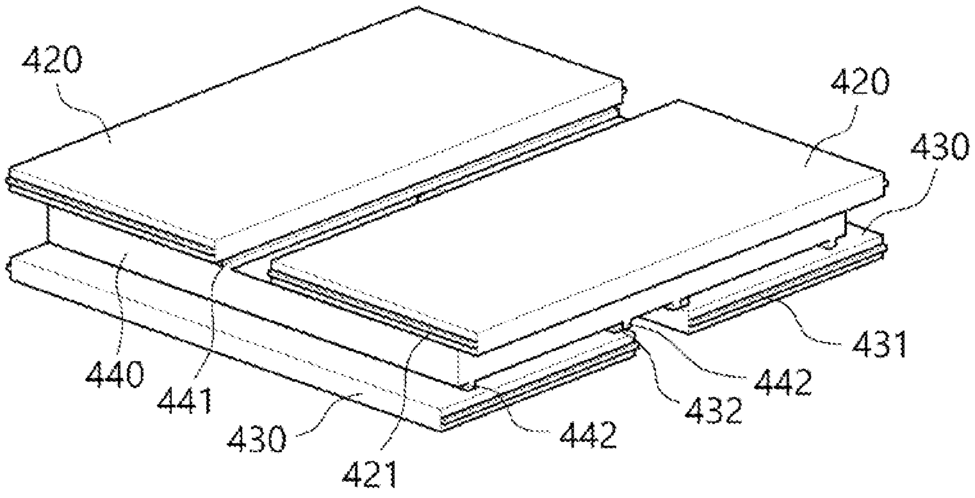
FIG. 5 is a perspective view illustrating an X-axis shield plate, a Y-axis shield plate, and a target plate provided in the irradiation area adjuster of FIG. 2.
Figure 6:
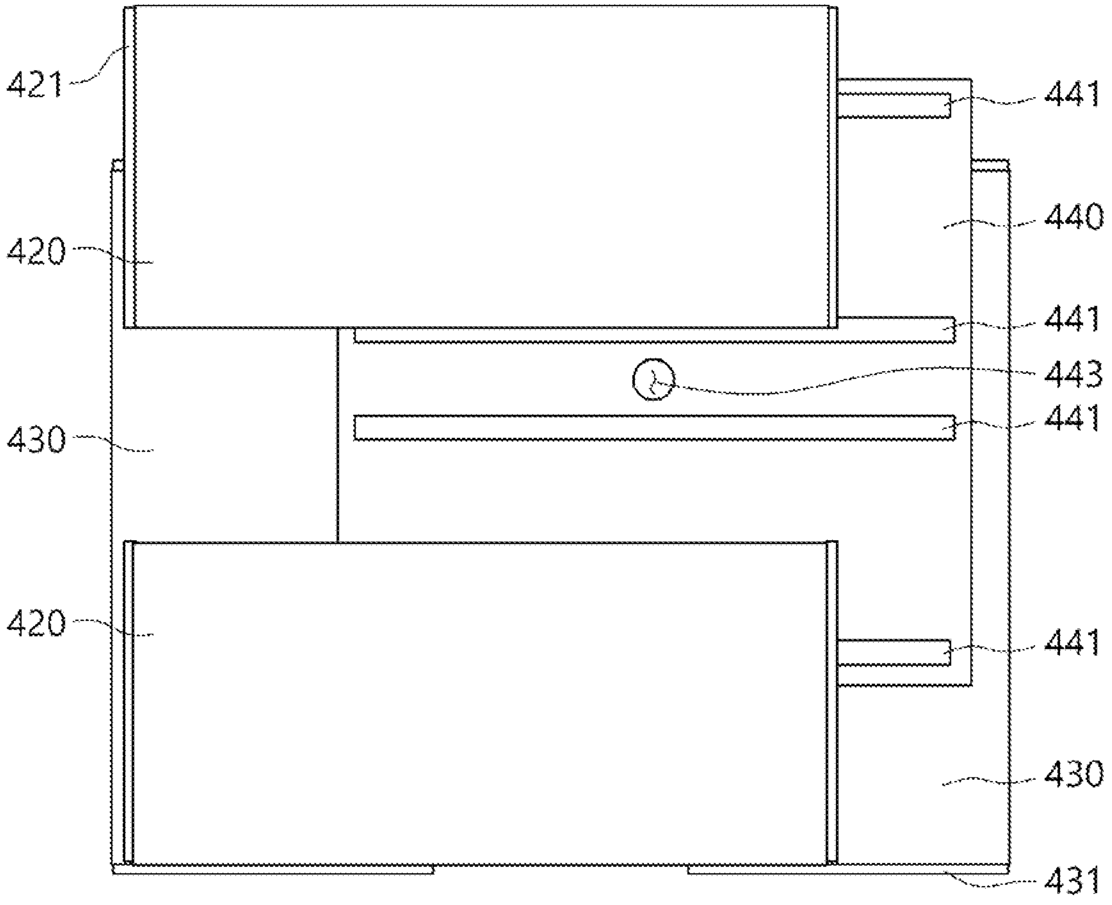
FIG. 6 is a plan view illustrating the X-axis shield plate, the Y-axis shield plate, and the target plate of FIG. 5.
Figure 7:
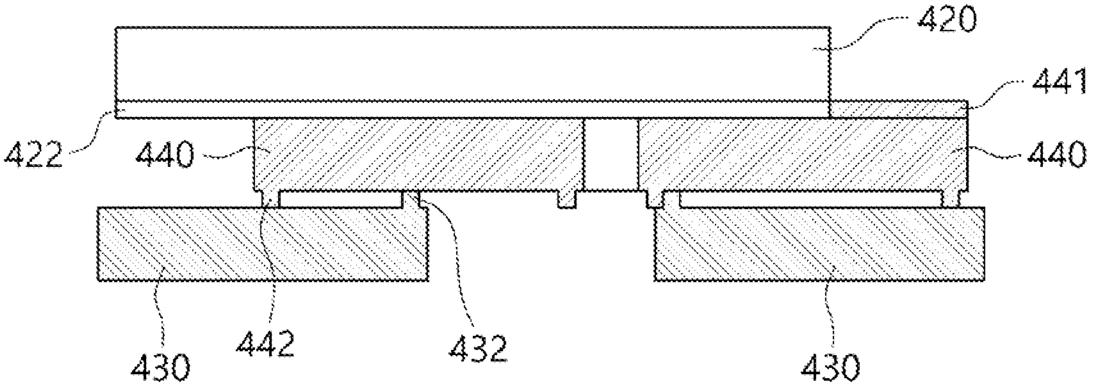
FIG. 7 is a side cross-sectional view illustrating the X-axis shield plate, the Y-axis shield plate, and the target plate of FIG. 5.

Hereinafter, the coupling relationship between the X-axis shield plate 420, the Y-axis shield plate 430, and the target plate 440 will be described in more detail with reference to FIGS. 5 to 7.

A plurality of first target stoppers 441 are formed on a contact surface of the target plate 440 with the X-axis shield plate 420. At this time, the plurality of first target stoppers 441 are arranged along the lateral direction. In one embodiment, two first target locking protrusions 441 may be provided on one surface of the target plate 440, respectively on the front side and the rear side with respect to the irradiation hole 443.

On the other hand, the X-axis shield stopper 422 is formed on the contact surface of the target plate 440 of the X-axis shield plate 420. The X-axis shield stopper 422 may be moved while sliding between two first target stoppers 441 adjacent to each other.

In the illustrated embodiment, the X-axis shield stopper 422 formed on the X-axis shield plate 420 on the front side is moved between two first target stoppers 441 located on the front side of the irradiation hole 443. In the above embodiment, the X-axis shield jaw 422 formed on the X-axis shield plate 420 on the rear side is moved between two first target stoppers 441 located on the rear side of the irradiation hole 443.

In an embodiment, the sum of the lateral width of the target plate 440 divided in half and the lateral width of the X-axis shield plate 420 is formed to be larger than the sum of the lateral widths of the through-holes 411*a* and 412*a* of the frame 410. This is to prevent radiation from leaking through the through-holes 411*a* and 412*a* without being shielded during the movement of the target plate 440 and the X-axis shield plate 420.

In addition, a plurality of second target stoppers 442 are formed on a contact surface of the target plate 440 with the Y-axis shield plate 430. In an embodiment, two second target stoppers 442 may be provided on the other surface of the target plate 440 on the left and right sides with respect to the irradiation hole 443.

On the other hand, a Y-axis shield stopper 432 is formed on the contact surface of the Y-axis shield plate 430 with the target plate 440. The Y-axis shield stopper 432 may be moved while sliding between two second target stoppers 442 adjacent to each other.

In the illustrated embodiment, the Y-axis shield stopper 432 formed on the Y-axis shield plate 430 on the left side is moved between two second target stoppers 442 located on the left side of the irradiation hole 443. In the above embodiment, the Y-axis shield stopper 432 formed on the Y-axis shield plate 430 on the right side is moved between two second target stopper 442 located on the right side of the irradiation hole 443.

In an embodiment, the sum of the longitudinal width of the target plate 440 divided in half and the longitudinal width of the Y-axis shield plate 430 is to be formed to be larger than the sum of the longitudinal widths of the through-holes 411*a* and 412*a* of the frame 410. This is to prevent radiation from leaking through the through-holes 411*a* and 412*a* without being shielded during the movement of the target plate 440 and the Y-axis shield plate 430.

In summary, radiation irradiation to positions other than the irradiation area may be shielded by the X-axis shield plate 420, Y-axis shield plate 430, and target plate 440. Accordingly, the cross-sectional areas of the target plate 440 and the shield plate required for shielding unnecessary radiation may be reduced. Furthermore, the volume of the gantry head and jig for supporting the same may be reduced.

Figure 8:
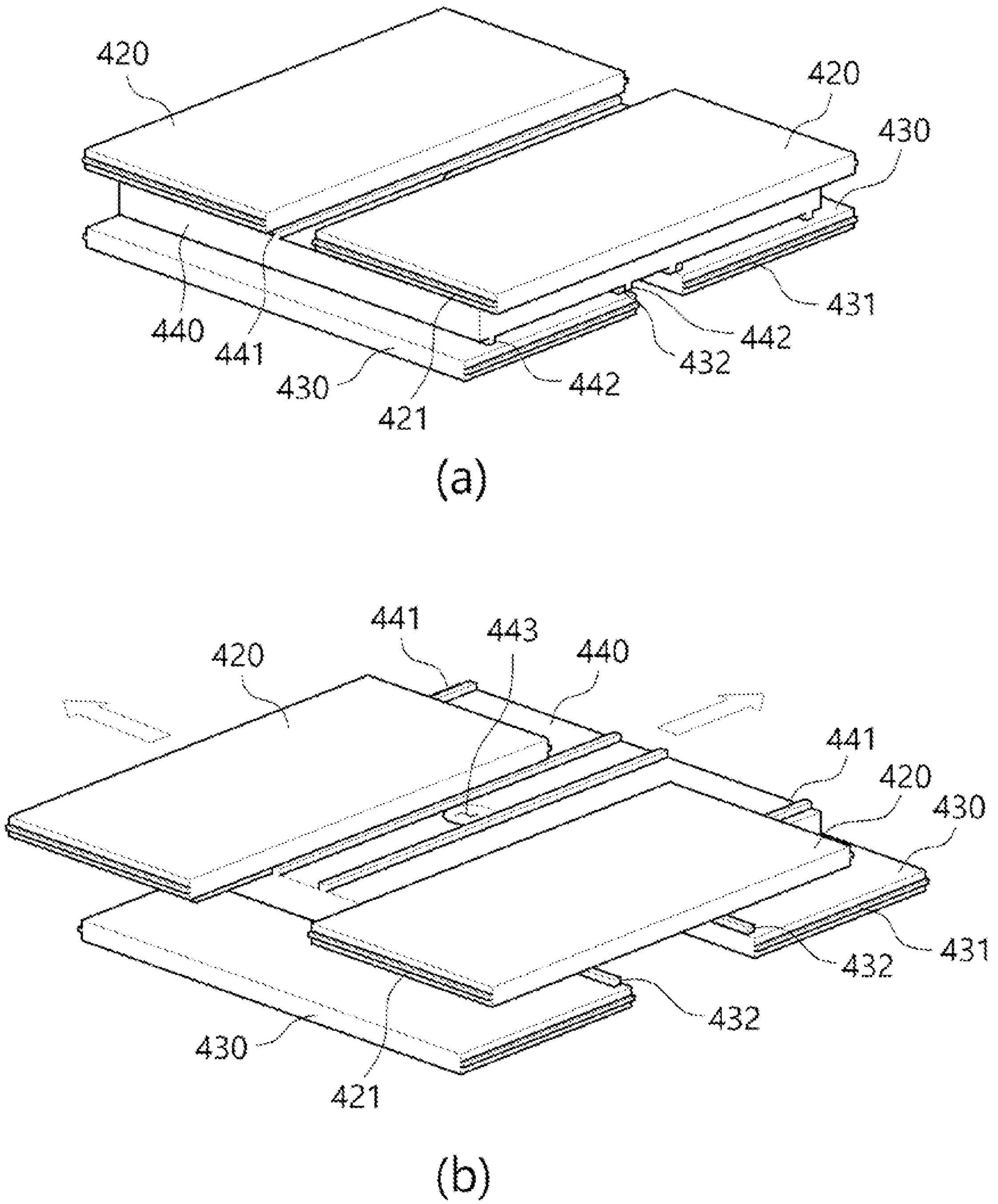
FIG. 8 is a perspective view illustrating a state before and after the position of the target plate is variable.
Figure 9:
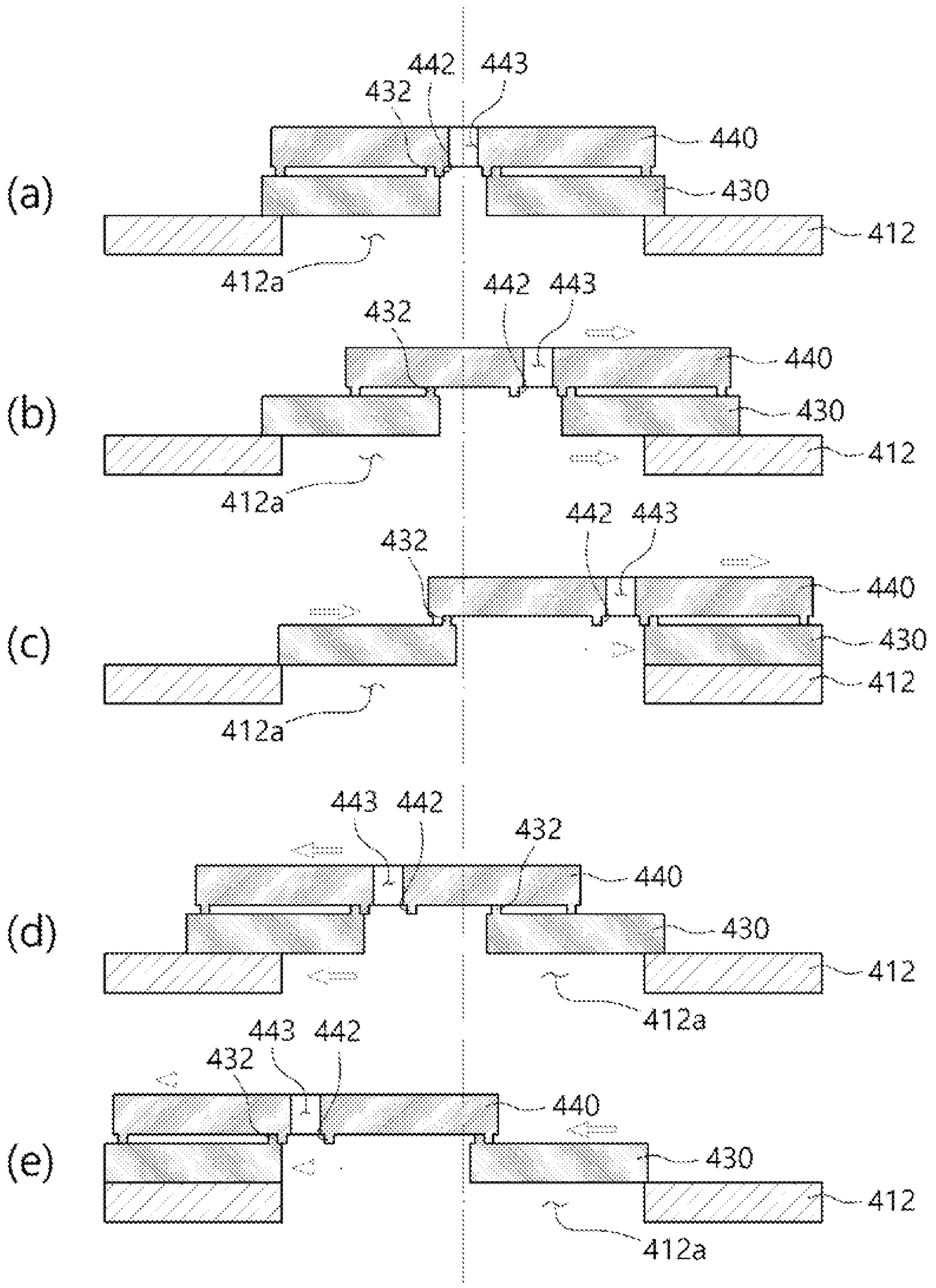
FIG. 9 is a side cross-sectional view illustrating a position variable process of the target plate.

Hereinafter, a position variable operation of the target plate 440 will be described with reference to FIGS. 8 and 9.

FIGS. 8A and 8B illustrate states before and after movement of the target plate 440, respectively. The target plate 440 may be moved relative to the frame 410 in the lateral and longitudinal directions. When the target plate 440 is moved, the X-axis shield plate 420 and the Y-axis shield plate 430 may also be moved along the movement direction thereof.

Hereinafter, the relationship between the target plate 440 and the shield plates 420 and 430 will be described by using the Y-axis shield plate 430 as an example.

FIGS. 9A to 9E illustrate a process in which the Y-axis shield plate 430 is also moved as the target plate 440 is moved. FIG. 9A illustrates the state before the movement of the target plate 440, FIGS. 9B and 9C illustrate the movement of the target plate 440 to the right, and FIGS. 9D and 9E illustrate the movement of the target plate 440 to the left.

As the target plate 440 is moved to the left or right, the second target stopper 442 formed on the target plate 440 is also moved to the left or right. In this case, when the second target stopper 442 adjacent to the irradiation hole 443 collides with any one of the Y-axis shield stopper 432, the collided Y-axis shield stopper 432 is also moved in the same direction along with the second target stopper 442.

In the above movement process, the lower through-hole 412*a*, which is located below the target plate 440 and the Y-axis shield plate 430, is shielded from irradiating radiation to the area except for a portion overlapped with the irradiation hole 443.

In this case, since only two motors are required for the X-axis position variable unit 320 and the Y-axis position variable unit 330 to change the position of the target plate 440, the structure of the radiation irradiation device 1 may be simplified more. As a result, the manufacturing cost and the manufacturing process of the radiation irradiation device 1 may be reduced, and the convenience of maintenance and repair may be improved more.

As described above, the radiation irradiation device 1 according to an embodiment of the present invention has been described. Hereinafter, the radiation irradiation device 1 according to another embodiment of the present invention will be described with reference to FIGS. 10 to 13.

The radiation irradiation device 1 according to this embodiment corresponds in functions and structures to the radiation irradiation device 1 according to the above-described embodiment. However, the radiation irradiation device 1 according to the present embodiment is different from the radiation irradiation device 1 according to the above-described embodiment in some components thereof.

More specifically, the radiation irradiation device 1 according to the present embodiment is different from the radiation irradiation device 1 according to the above-described embodiment in that one or more pairs of shield plates 520 are provided and one or more pairs of leaves 531 are provided on the target plate 530.

Hereinafter, the radiation irradiation device 1 according to the present embodiment will be described focusing on differences from the radiation irradiation device 1 according to the above-described embodiment.

The radiation irradiation device 1 according to the present embodiment includes a radiation source 10, a controller 20, a driver 30, and an irradiation area adjuster 50.

Among the above components, the radiation source 10, the controller 20, and the driver 30 have the same structure, function, and coupling structure as the radiation source 10, the controller 20, and the driver 30 according to the above-described embodiment thereof.

However, the radiation area adjuster 50 differs from the radiation area adjuster 40 according to the above-described embodiment in some components thereof.

Figure 10:
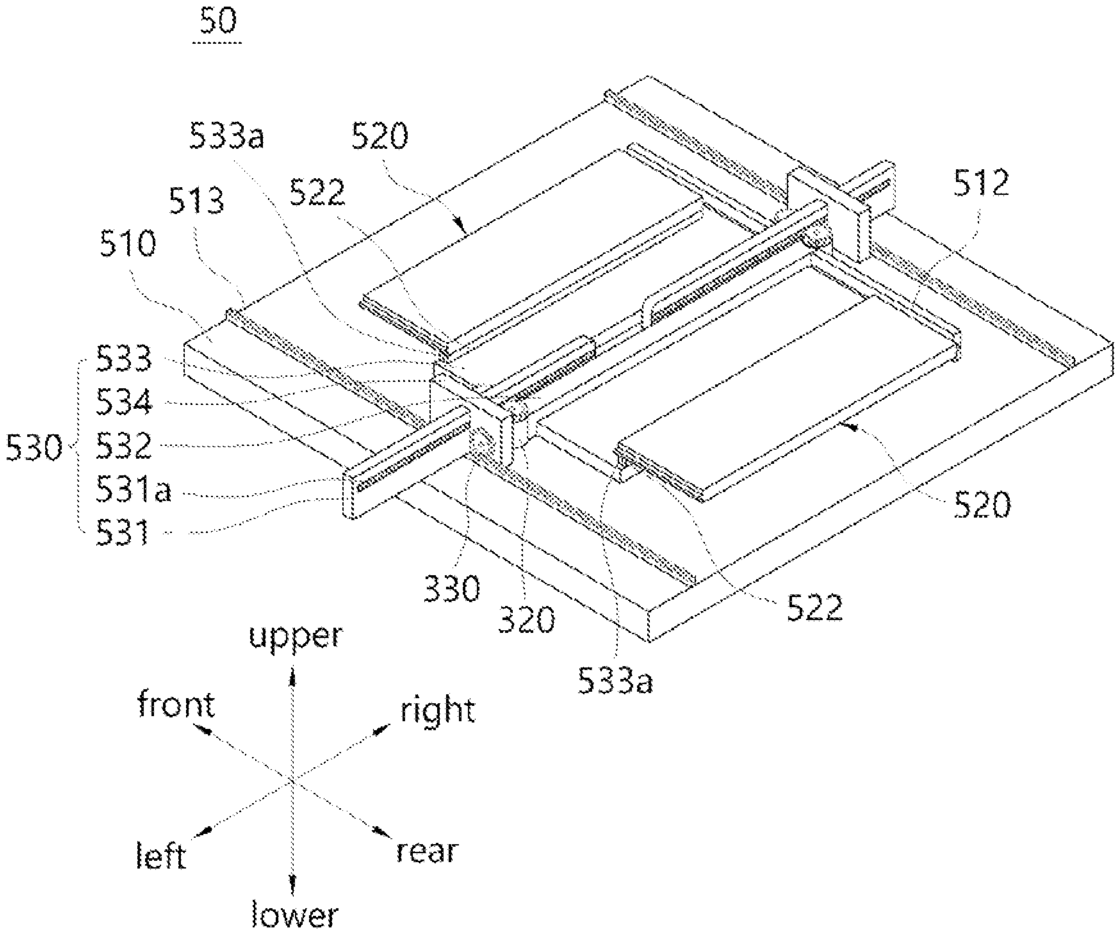
FIG. 10 is a perspective view illustrating an irradiation area adjuster according to another embodiment of the present invention.
Figure 11:
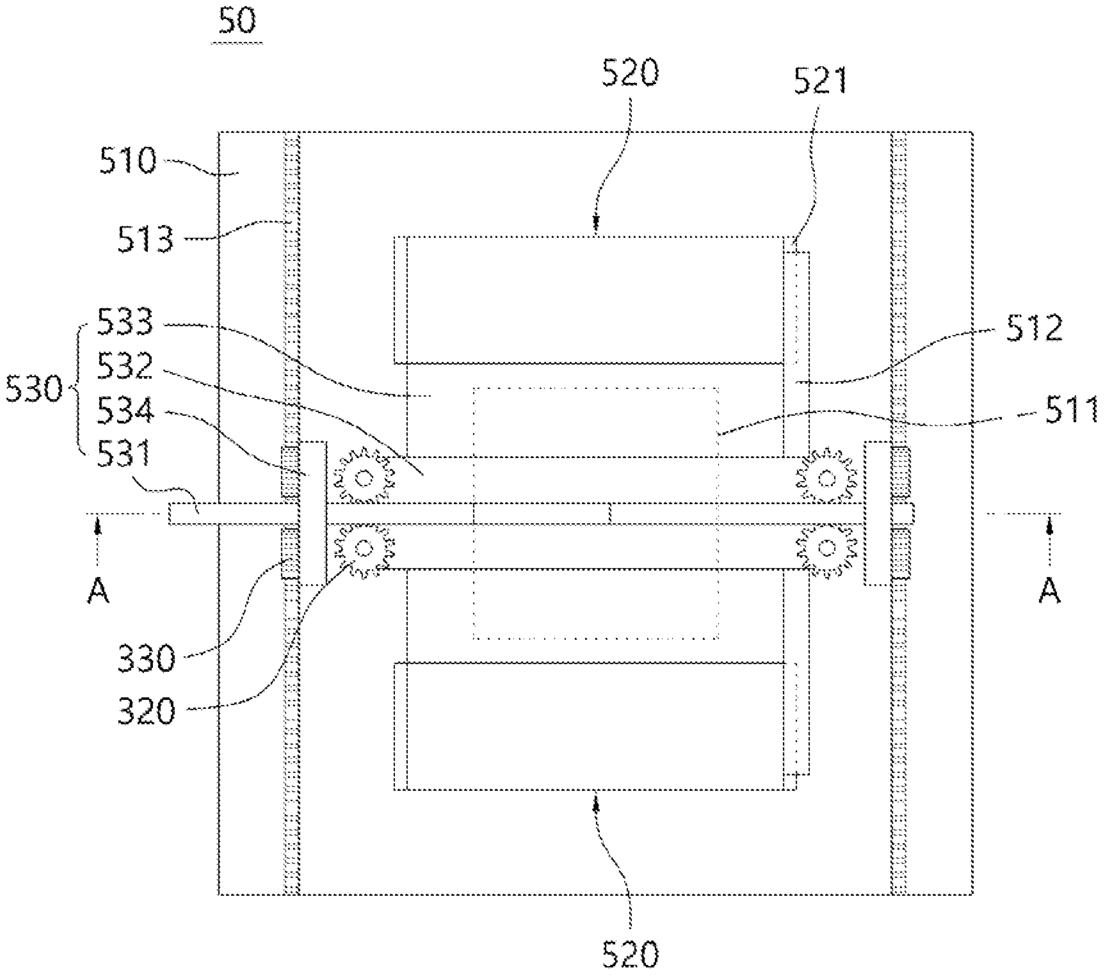
FIG. 11 is a plan view illustrating the irradiation area adjuster of FIG. 10.
Figure 12:
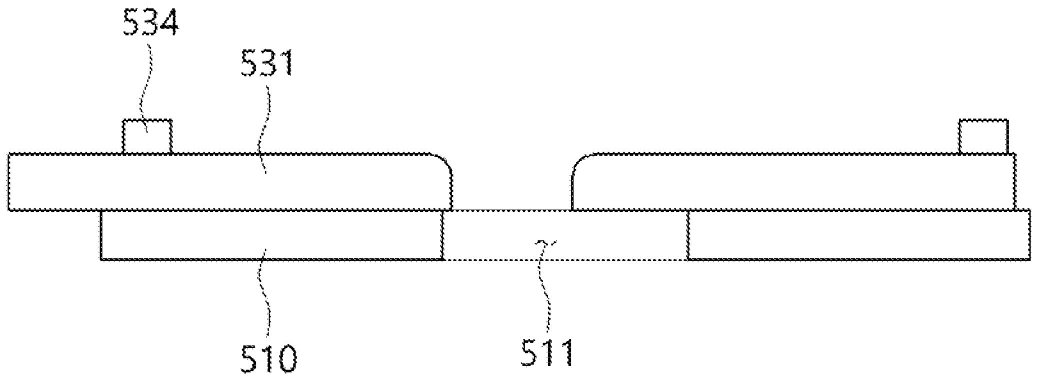
FIG. 12 is a side cross-sectional view illustrating the irradiation area adjuster of FIG. 10.

Hereinafter, the radiation area adjuster 50 according to the present embodiment will be described with reference to FIGS. 10 to 12.

The irradiation area adjuster 50 is operated by the driver 30 to manipulate the radiation irradiation position and the irradiation area. To this end, the irradiation area adjuster 50 is electrically connected to the X-axis position variable unit 320 and the Y-axis position variable unit 330.

In the illustrated embodiment, the irradiation area adjuster 50 includes a frame 510, a shield plate 520, and a target plate 530.

The frame 510 forms the lower exterior of the irradiation area adjuster 50. Additionally, the frame 510 provides a space where various components of the irradiation area adjuster may be mounted. In the illustrated embodiment, various components may be disposed on one side of the frame 510. In an embodiment not shown, a space in which various components may be accommodated may be formed inside the frame 510.

However, the frame 510 is not limited to the above embodiment, and may be formed in various structures that provide a variable path of other components.

A through-hole 511 is formed in a portion of the frame 510. In the illustrated embodiment, the through-hole 511 is located at the central portion of the frame 510.

The through-hole 511 functions as a passage of radiation emitted from the radiation source 10. In addition, the through-hole 511 is disposed adjacent to the object to be irradiated.

In the illustrated embodiment, the through-hole 511 is formed with a square cross-section extending in the vertical direction. However, the through-hole 511 is not limited to the shape shown and may be formed in various shapes corresponding to the irradiation area. For example, the through-hole 511 may have a circular cross-section extending in the vertical direction.

A guider 512 is provided on one side of the frame 510.

The guider 512 guides the longitudinal movement path of the shield plate 520 to be described later. In the illustrated embodiment, a groove is formed on one surface of the guider 512, thereby limiting the movement path of the shield plate 520. This will be described later in detail.

Frame rails 513 extending in a longitudinal direction are formed on both sides of one surface of the frame 510 in the lateral direction, respectively.

The frame rails 513 guides the longitudinal movement path of the target plate 530 to be described later. This will be described later in detail.

One side of the frame 510 is coupled to the shield plate 520.

The shield plate 520 shields the periphery of the target plate 530 so that the radiation is not irradiated to the longitudinal periphery of the target plate 530.

The shield plate 520 may be relatively moved in the longitudinal direction with respect to the frame part 510. In the illustrated embodiment, the movement of the shield plate 520 may be guided by the guider 512 of the frame 510.

The shield plate 520 is formed in a plate shape that may slide with respect to the frame 510. In the illustrated embodiment, the shield plate 520 is formed in a rectangular plate shape with a longitudinal width smaller than a lateral width.

In addition, the longitudinal width of the shield plate 520 is preferably larger than the longitudinal width of the through-hole 511 of the frame 510. This is to prevent accidents in which the radiation leaks between the shield plate 520 and the through-hole 511.

Shield coupling protrusions 521 are formed to protrude from both ends of the shield plate 520 in the lateral direction, respectively. The shield coupling protrusions 521 are inserted into and coupled to the guider 512 of the frame 510, and may be reciprocally moved in the longitudinal direction along the groove of the guider 512.

In addition, the shield stopper 522 is formed to protrude on one surface of the shield plate 520, that is, the upper surface in the illustrated embodiment.

A plurality of shield plates 520 may be provided. In the illustrated embodiment, two shield plates 520 are provided.

A target plate 530 is disposed between the two shield plates 520.

The target plate 530 determines an irradiation area, a shielding region, and an irradiation area of the radiation by varying its position.

In the illustrated embodiment, the target plate 530 is coupled to one surface of the frame 510. At this time, the target plate 530 may be relatively moved with respect to the frame 510. In an embodiment not shown, the target plate 530 may be accommodated in an inner space of the frame 510.

The target plate 530 is disposed to overlap the through-hole 511 of the frame 510 in the radiation irradiation direction. In the illustrated embodiment, the target plate 530 overlaps the through-hole 511 in the vertical direction, which is the radiation irradiation direction.

The shield plates 520 are coupled to one surface of the target plate 530, that is, both sides in the longitudinal direction of the upper surface in the illustrated embodiment. In addition, the target plate 530 may be sliding in the longitudinal direction with respect to the frame 510 and the shield plates 520. To this end, the target plate 530 is formed in a plate shape that may slide with respect to the frame 510 and the shield plates 520.

In the radiation irradiation direction, the sum of the cross-sectional area of the target plate 530 and the cross-sectional area of the shield plates 520 is larger than that of the through-hole 511 of the frame 510. In addition, the sum of the longitudinal width of the target plate 530 divided in half and the longitudinal width of the shield plate 520 is formed to be larger than the longitudinal width of the through-hole 511 of the frame 510. This is to prevent leakage of radiation that is not shielded by the target plate 530.

A target stopper 533*a* is formed on the contact surface of the target plate 530 with the shield plate 520. The target stopper 533*a* limits the longitudinal movement of the entire shield plate 520 by limiting the longitudinal movement of the shield stopper 522. This will be described later in detail.

In the illustrated embodiment, the target plate 530 includes a leaf 531, a leaf guider 532, a wing 533, and a leaf supporter 534.

The leaf 531 determines the irradiation position and the irradiation area of the radiation by varying its position.

The leaf 531 may be coupled to one surface of the frame 510 and may be relatively moved in the lateral direction or the longitudinal direction with respect to the frame 510.

The leaf 531 is disposed to overlap the through-hole 511 of the frame 510 in the radiation irradiation direction. In the illustrated embodiment, the leaf 531 overlaps the through-hole 511 in the vertical direction, which is the radiation irradiation direction.

A plurality of leaves 531 may be provided. In the illustrated embodiment, two leaves 531 are provided as a pair. In the above embodiment, a pair of leaves 531 are arranged side by side in the lateral direction.

Both lateral ends of the leaf 531 are coupled to the frame rail 513 and the Y-axis position variable unit 330, respectively. Additionally, the Y-axis position variable unit 330 is coupled to the frame rail 513 and rotates along the frame rail 513. As the Y-axis position variable unit 330 is rotated along the frame rail 513, the leaf 531 may be moved in the longitudinal direction. That is, the longitudinal movement of the leaf 531 may be guided by the frame rail 513.

Leaf rails 531*a* are formed on both surfaces of the leaf 531 in the longitudinal direction. The leaf rails 531*a* are formed to extend in the lateral direction. In addition, the leaf rails 531*a* are coupled to the X-axis position variable unit 320 to guide the rotation of the X-axis position variable unit 320. As the X-axis position variable unit 320 is rotated along the leaf rails 531*a*, the leaf 531 may be moved in the lateral direction.

The leaf guiders 532 are disposed on both sides of the leaf 531 in the longitudinal direction, respectively.

The leaf guiders 532 guide the lateral movement path of the leaf 531. That is, the leaf 531 may be moved in the lateral direction between the two leaf guiders 532.

The leaf guiders 532 are coupled to the leaf 531 and are moved in the same direction as the leaf 531 when the leaf 531 moves in the longitudinal direction.

Wings 533 are coupled to both sides of the leaf guiders 532 in the longitudinal direction.

The wings 533 block the through-hole 511 of the frame 510 so that the radiation does not leak to an area other than the predetermined irradiation area.

The winger 533 is formed to extend from one side of the longitudinal direction of the leaf guider 532 in a direction away from the leaf 531.

A target stopper 533*a* is formed on a contact surface of the wing 533 with the shield plate 520.

The target stopper 533*a* limits the longitudinal movement of the shield stopper 522 of the shield plate 520. Accordingly, the shield stopper 522 may be moved between the target stopper 533*a* and the leaf guider 532.

Both sides of the leaf guider 532 in the lateral direction are coupled to the leaf supporter 534.

The leaf supporter 534 supports the leaf 531 and the leaf guider 532 in the lateral direction, and prevents the leaf 531 from being randomly separated.

The leaf supporter 534 is disposed to surround at least a portion of the outer circumferential surface of the leaf 531. In other words, the leaf 531 is coupled through the leaf supporter 534.

In addition, the leaf 531 may be sliding in the lateral direction with respect to the leaf supporter 534. For this purpose, the through-hole of the leaf supporter 534 preferably has a cross-sectional area larger than the cross-sectional area of the leaf 531 in the later direction.

Hereinafter, a position variable operation of the leaf 531 will be described with reference to FIG. 13.

Figure 13:
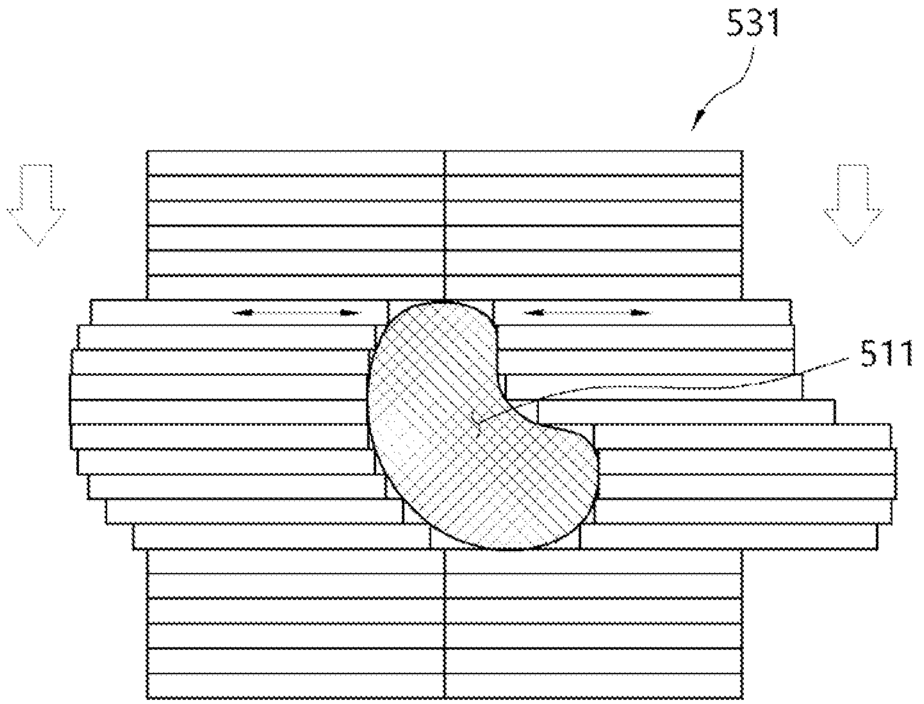
FIG. 13 is a plan view illustrating a position variable process of a leaf provided in the irradiation area adjuster of FIG. 10.

FIG. 13 schematically illustrates the position variable operation of the leaf 531 in a radiation irradiation process. In this case, it is assumed that the region through which the leaf 531 moves is not irradiated because the radiation is blocked.

The leaf 531 may be moved laterally and longitudinally by the driver 30 while passing through the through-hole 511 of the frame 510.

In an embodiment, a pair of leaves 531 are moved longitudinally at the same speed as the radiation is irradiated. In the illustrated embodiment, the pair of leaves 531 are moved from an upper side to a lower side at the same speed.

At this time, the longitudinal movement of the pair of leaves 531 is performed by the Y-axis position variable unit 330 and is guided by the frame rail 513 of the frame 510.

In the process of longitudinal movement of the pair of leaves 531, each leaf 531 may independently perform lateral movement. In the above process, an interval between the pair of leaves 531 may be varied.

In this case, the interval between the pair of leaves 531 may correspond to a predetermined radiation irradiation area.

In addition, the lateral movement of each leaf 531 is performed by an X-axis position variable unit 320 and is guided by a leaf rail 531*a*.

Figure 14:
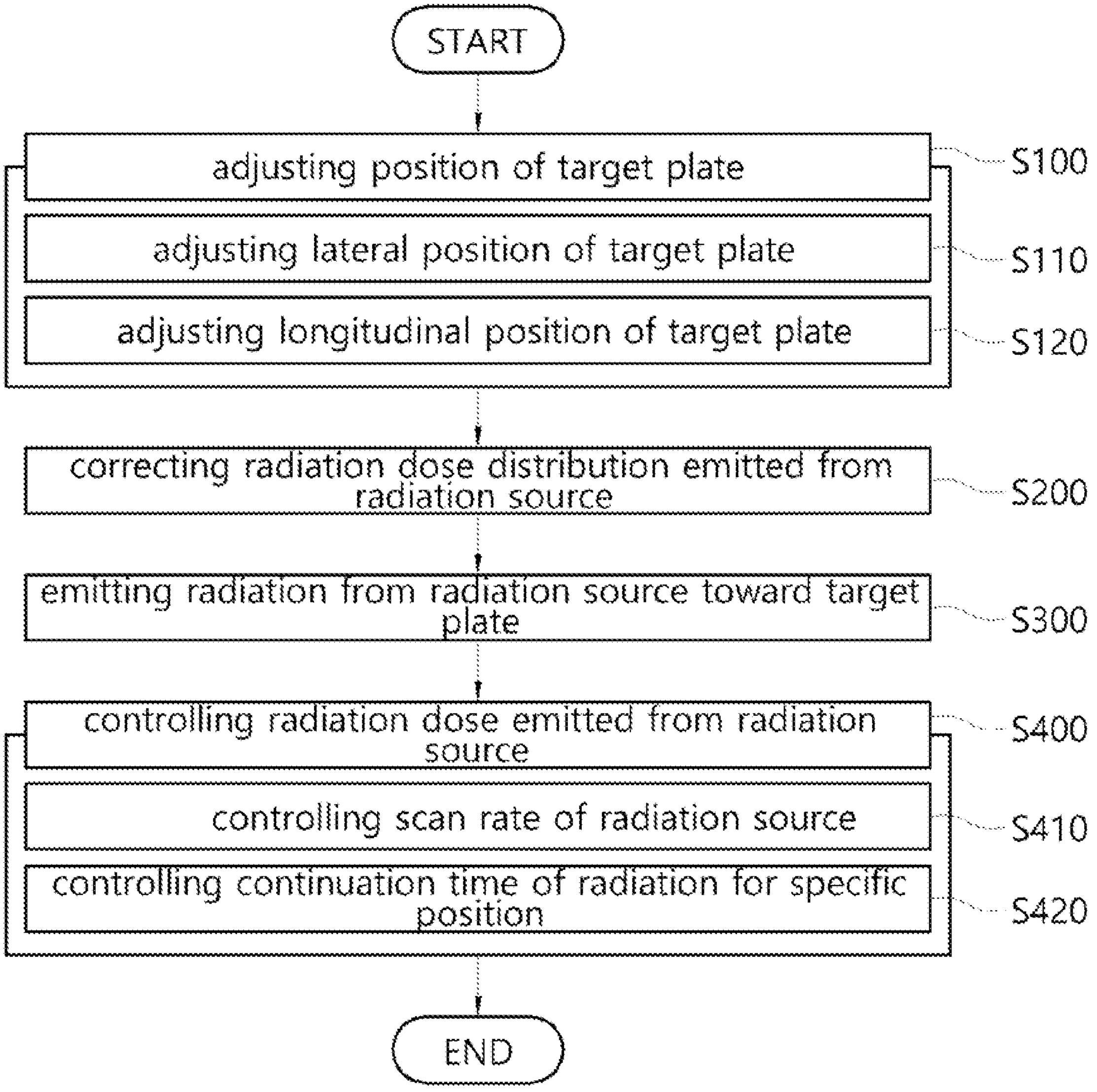
FIG. 14 is a flowchart illustrating a radiation irradiation method according to an embodiment of the present invention.

In summary, the pair of leaves 531 may be moved in the lateral direction and the longitudinal direction to control the radiation irradiation area. Accordingly, the cross-sectional areas of the target plate 530 and the shield plate 520 required for shielding unnecessary radiation may be reduced. Furthermore, the structure of the irradiation device 1 may be simplified, and the manufacturing cost and manufacturing process may be reduced. Hereinafter, a radiation irradiation method according to an embodiment of the present invention will be described with reference to FIG. 14.

The radiation irradiation method according to an embodiment of the present invention includes adjusting the position of the target plate 440 (step S100), correcting distribution of a radiation dose emitted from the radiation source 10 (step S200), emitting the radiation from the radiation source 10 toward the target plate 440 (step S300), and controlling the radiation dose emitted from the radiation source 10 (step S400).

First, the adjusting the position of the target plate 440 (step S100) will be described.

In the illustrated embodiment, the adjusting the position of the target plate 440 (step S100) includes adjusting the lateral position of the target plate 440 (step S110) and adjusting the longitudinal position of the target plate 440 (step S120).

To begin with, the radiation irradiation device 1 is installed in the object to be irradiated. At this time, the through-holes 411*a* and 412*a* of the frame 410 are located in the irradiation area. However, the radiation required is formed differently depending on the irradiation position, so the target plate 440 having the irradiation hole 443 needs to be moved and adjusted.

The X-axis position controller 231 and the Y-axis position controller 232 of the irradiation position controller 230 calculate lateral and longitudinal coordinates of the irradiation position of the target plate 440, respectively. In addition, the irradiation position controller 230 transmits the calculation result to the X-axis position variable unit 320 and the Y-axis position variable unit 330.

The X-axis position variable unit 320 and the Y-axis position variable unit 330 receiving the calculation result may move the target plate 440 in the lateral direction or the longitudinal direction. When the target plate 440 is moved, the X-axis shield plate 420 and the Y-axis shield plate 430 are coupled to both sides of the target plate 440 to shield the radiation from being irradiated to the areas outside the irradiation hole 443.

When the target plate 440 is moved to a predetermined irradiation position, correcting the radiation dose distribution emitted from the radiation source 10 (step S200) is performed.

As for the radiation dose emitted from the radiation source 10, there is a possibility that the distribution of the radiation dose for each point in the irradiation area is biased toward one side. Accordingly, before radiation is emitted, the radiation dose distribution correction coefficient is calculated by the radiation dose distribution corrector 210. Thereafter, the radiation dose distribution corrector 210 transmits the calculation result to the radiation source 10.

When the calculation result is transmitted to the radiation source 10, emitting the radiation from the radiation source 10 toward the target plate 440 (step S300) and controlling the radiation dose emitted from the radiation source 10 (step S400) are performed.

In an embodiment, the controlling the radiation dose emitted from the radiation source 10 (step S400) includes controlling the scan rate of the radiation source 10 (step S410) and controlling the continuation time of the radiation for a specific position (step S420).

The irradiation position controller 230 may increase or decrease the intensity of the radiation emitted from the radiation source 10 by decreasing or increasing the scan rate of the radiation source 10. In addition, the continuation time controller 240 may increase or decrease the intensity of the radiation emitted from the radiation source 10 by increasing or decreasing the radiation irradiation time for the specific point.

Although the present invention has been described with reference to the preferred embodiments, the present invention is not limited to the configuration of the above-described embodiments.

In addition, the present invention may be variously modified and changed within the scope of the spirit and scope of the present invention as set forth in the claims below by those skilled in the art to which the present invention pertains.

Furthermore, the above embodiments may be configured by selectively combining all or part of each embodiment so that various modifications may be made.

DESCRIPTION OF SYMBOLS

1: radiation irradiation device
10: radiation source
20: controller
210: radiation dose distribution corrector
220: scan rate controller.
230: irradiation position controller
231: X-axis position controller
232: Y-axis position controller
240: continuation time controller
30: driver
310: X-ray tube driver
320: X-axis position variable unit
330: Y-axis position variable unit
40: One embodiment of irradiation area adjuster
410: frame
411: upper frame
411*a*: upper through-hole
411*b*: upper concave
411*c*: upper guide groove
412: lower frame
412*a*: lower through-hole
412*b*: lower concave
412*c*: lower guide groove
413: fixing member
420: X-axis shield plate
421: X-axis shield coupling protrusion
422: X-axis shield stopper
430: Y-axis shield plate
431: Y-axis shield coupling protrusion
432: Y-axis shield stopper
440: target plate
441: first target stopper
442: second target stopper
443: irradiation hole
450: aperture
451: transmission hole
50: another embodiment of irradiation area adjuster
510: frame
511: through-hole
512: guider
513: frame rail
520: shield plate
521: shield coupling protrusion
522: shield stopper
530: target plate
531: leaf
531*a*: leaf rail
532: leaf guider
533: wing

533*a*: target stopper
534: leaf supporter

The invention claimed is:

1. A radiation irradiating device, comprising:
a radiation source;
a target plate having an irradiation hole through which radiation emitted from the radiation source passes, and having a first target stopper and a second target stopper formed to protrude on both surfaces, respectively;
X-axis shield plates coupled to both sides in a lateral direction of one surface of the target plate, having an X-axis shield stopper formed on a contact surface with the target plate, and capable of being laterally moved with respect to the target plate; and
Y-axis shield plates coupled to both sides in a longitudinal direction of the other surface of the target plate, having a Y-axis shield stopper formed on a contact surface with the target plate, and capable of being longitudinally moved with respect to the target plate,
wherein the X-axis shield stopper is capable of being moved between two first target stoppers adjacent to each other, and
wherein the Y-axis shield stopper is capable of being moved between two second target stoppers adjacent to each other.

2. The radiation irradiation device of claim 1, comprising:
a frame coupled to the target plate, the X-axis shield plates, and the Y-axis shield plates to be relatively moved with respect to each other, and having a through-hole overlapping the irradiation hole in an irradiation direction of the radiation,
wherein the through-hole has a cross-sectional area that is larger than the cross-sectional area of the irradiation hole and is smaller than that of the target plate.

3. The radiation irradiation device of claim 2,
wherein a lateral width of the through-hole is formed to be smaller than the sum of a lateral width of the target plate divided in half and a lateral width of the X-axis shield plates, and
wherein a longitudinal width of the through-hole is formed to be smaller than the sum of a longitudinal width of the target plate divided in half and a longitudinal width of the Y-axis shield plates.

4. The radiation irradiation device of claim 2,
wherein, the X-axis shield plates have X-axis shield coupling protrusions formed to protrude from both ends in the longitudinal direction,
wherein, the Y-axis shield plates have Y-axis shield coupling protrusions formed to protrude from both ends in the lateral direction, respectively,
wherein, the frame has a guide groove formed to be recessed, and while the X-axis shield coupling protrusions or the Y-axis shield coupling protrusion are inserted into the guide groove, the guide groove guides a movement path of the X-axis shield plates or the Y-axis shield plates.

5. The radiation irradiation device of claim 1, comprising:
a controller configured to adjust an intensity of the radiation irradiated to a specific point.

6. The radiation irradiation device of claim 5, wherein the controller comprises:
a scan rate controller configured to adjust a scan rate of the radiation source;
a continuation time controller configured to adjust a radiation irradiation time for the specific point; and
a radiation dose distribution corrector configured to calculate a radiation dose distribution correction coefficient for each point in an irradiation area, and apply the calculation result to the radiation source.

7. The radiation irradiation device of claim 1, wherein the radiation source is capable of emitting the radiation repeatedly multiple times with respect to a specific point.

8. The radiation irradiation device of claim 1, wherein the radiation emitted from the radiation source is an X-ray.

9. A radiation irradiation method using the radiation irradiation device of claim 1, comprising:
adjusting a position of the target plate;
emitting the radiation from the radiation source toward the target plate; and
controlling a radiation dose emitted from the radiation source.

10. The radiation irradiation method of claim 9, wherein the adjusting comprises:
adjusting a lateral position of the target plate; and
adjusting a longitudinal position of the target plate.

11. The radiation irradiation method of claim 9, wherein the method further comprises correcting a distribution of the radiation dose emitted from the radiation source prior to the emitting.

12. The radiation irradiation method of claim 9, wherein the controlling comprises:
controlling a scan rate of the radiation source.

13. The radiation irradiation method of claim 9, wherein the controlling comprises:
controlling a continuation time of the radiation with respect to a specific position.

14. A radiation irradiating device, comprising:
a radiation source;
a frame having a through-hole through which radiation emitted from the radiation source passes, and having frame rails extended in a longitudinal direction on both sides of a lateral direction of one surface;
a target plate including at least one pair of leaves and a leaf guider disposed on both sides of the at least one pair of leaves in the longitudinal direction, respectively, and having a target stopper formed on both sides of the longitudinal direction; and
a shield plate coupled to both sides of the longitudinal direction of the target plate, formed with a shield stopper on a contact surface with the target plate, and movable in the longitudinal direction with respect to the target plate,
wherein the at least one pair of leaves are capable of being moved laterally between the two leaf guiders and moved longitudinally along the frame rail, and
wherein the shield stopper is capable of being moved between the target stopper and the leaf guider.

15. The radiation irradiation device of claim 14, wherein a longitudinal width of the through-hole is formed to be smaller than the sum of a longitudinal width of the target plate divided in half and a longitudinal width of the shield plate.

16. The radiation irradiation device of claim 14, wherein the target plate comprises:
a wing extended from one side of the longitudinal direction of the leaf guider in a direction away from the leaves, and having a target stopper formed on one end thereof.

17. The radiation irradiation device of claim 14, wherein the leaves have a leaf rail extended in the lateral direction on both surfaces of the longitudinal direction, and are capable of being moved in the lateral direction by an X-axis position variable unit rotated along the leaf rail.

18. The radiation irradiation device of claim 14, wherein the frame has a guider formed to be recessed, and the guider guides a longitudinal movement path of the shield plate, and wherein the shield plate has shield coupling protrusions formed to protrude from both ends in the lateral direction, and the shield coupling protrusions are inserted into the guider and are movable along the guider.

19. The radiation irradiation device of claim 14, comprising:

a controller configured to adjust an intensity of the radiation irradiated to a specific point.

20. The radiation irradiation device of claim 19, wherein the controller comprises:

a scan rate controller configured to adjust a scan rate of the radiation source;

a continuation time controller configured to adjust a radiation irradiation time for the specific point; and a radiation dose distribution corrector configured to calculate a radiation dose distribution correction coefficient for each point in an irradiation area, and apply the calculation result to the radiation source.

* * * * *